United States Patent

Cheng

[11] Patent Number: 6,157,485
[45] Date of Patent: Dec. 5, 2000

[54] LENS ARRANGEMENT FOR ENHANCING THE COUPLING OF LIGHT SHIFTED BY AN OPTICAL ELEMENT

[76] Inventor: Yihao Cheng, 36 Meadowbreeze Drive, Kanata, Ontario, Canada, K2M 2L6

[21] Appl. No.: 09/358,444

[22] Filed: Jul. 22, 1999

Related U.S. Application Data

[63] Continuation-in-part of application No. 08/942,496, Oct. 2, 1997, Pat. No. 5,991,076, which is a continuation-in-part of application No. 08/896,540, Jul. 18, 1997, Pat. No. 5,850,493.

[51] Int. Cl.[7] .............................. G02B 27/28; G02B 6/26
[52] U.S. Cl. ............................................ 359/495; 385/31
[58] Field of Search ............................... 359/495; 385/31, 385/33, 34, 35, 47

[56] References Cited

U.S. PATENT DOCUMENTS 5,845,023  12/1998  Lee ............................................. 385/34

*Primary Examiner*—Cassandra Spyrou
*Assistant Examiner*—Jared Treas
*Attorney, Agent, or Firm*—Neil Teitelbaum

[57] ABSTRACT

An optical device that includes a filter element which affects a beam incident thereon by shifting it is provided with a lens, wherein a distance between the lens end face and the filter is different than the distance between the lens end face and the input waveguide. By ensuring an appropriate difference in distance, optimum coupling is achieved even in view of the beam shift from the filter.

15 Claims, 4 Drawing Sheets

LENS ARRANGEMENT FOR ENHANCING THE COUPLING OF LIGHT SHIFTED BY AN OPTICAL ELEMENT

This application is a Continuation-in-Part of application Ser. No. 08/942,496 filed Oct. 2, 1997 now U.S. Pat. No. 5,991,076, entitled Optic Circulator which is a Continuation-in-Part of application of Ser. No. 08/896,540 filed Jul. 18, 1997, now U.S. Pat. No. 5,850,493 entitled Device for Focusing Light Through an Optical Component.

FIELD OF THE INVENTION

This invention relates generally to optical devices that use lenses for collimating and focusing light therethrough, and more particularly for a device that utilizes one or more of these lenses to provide a suitable beam for use in combination with another optical component.

BACKGROUND OF THE INVENTION

Currently lenses of various types are used to collimate a diverging light beam exiting an optical waveguide and to focus light that is launched into an optical waveguide so as to more efficiently couple the light.

One of the most ubiquitous building blocks used in the design and manufacture of optical elements is the graded index (GRIN) lens. Lenses of this type are produced under the trade name "SELFOC"; the mark is registered in Japan and owned by the Nippon Sheet and Glass Co. Ltd. GRIN lenses in combination with other optical elements are used in the manufacture of WDM devices, optical couplers, circulators, isolators, and other devices. The use of a GRIN lens in this invention provides a number of advantages over other conventional lenses, however does not limit the invention to only GRIN lenses.

Advantages of GRIN lenses are that they are relatively inexpensive, compact, and furthermore have parallel flat end faces. In particular, the flat end face of the GRIN lens allows a single lens to be used as a means of collimating or focusing the light, and as well, as a means of tapping light reflected from the end face of the lens.

Quarter pitch focusing/collimating GRIN lenses are known to be used having their collimating ends adjacent one another in a back to back relationship, and having a thin optical element such as a dichroic thin film filter sandwiched therebetween. Such an arrangement may serve as a multiplexing/demultiplexing optical filter. One or more optical fibers are typically coupled to an input end and to an output end (outwardly facing ends of the lenses) of the device. For these filters to work efficiently, without high coupling losses, it is especially important for the dichroic element disposed between the two lenses to be very thin. When thicker multi-layer, multi-cavity dichroic filters are used, a beam incident thereon often becomes shifted. This application provides a solution which allows optimum coupling of light when a beam shift from an optical element occurs. Although GRIN lenses are preferred in embodiments of this invention, other lenses can be utilized.

When two quarter pitch GRIN lenses are placed directly adjacent one another with their collimating ends coupled, light launched into the input end from an input optical fiber having its optical axis parallel to but offset with the optical axis of the GRIN lens is directed to a location at the output end of the second GRIN lens. The light leaving the second lens is directly coupled into an output fibre that is parallel with the optical axis and the input optical fibre but offset thereto. However, if the lenses are unduly spaced, light exiting the output (focusing) end exits at an angle to the optical axis of the lens and is difficult to couple to a waveguide, for example to an optical fibre that does not have its optical axis parallel with the optical axis of the lens. This is a particular problem when a relatively thick optical element such as an isolator is disposed adjacent to a GRIN lens. Furthermore, this invention provides a lens arrangement, which obviates coupling problems associated with some optical elements that induce a beam shift.

This invention obviates this difficulty, by providing a lens arrangement that is compatible with a relatively thin or thick optical element disposed between input and output waveguides.

SUMMARY OF THE INVENTION

This invention advantageously, provides an arrangement of lenses and input/output waveguides that allows an optical element that induces a beam shift to be disposed therebetween, and while allowing the input/output waveguides to remain parallel to one another while efficiently coupling light with no more than minimal coupling loss.

In accordance with the invention there is provided, an optical device comprising:

a first port for launching a beam of light and a second port for receiving at least a portion of the beam of light;

an optical element for directing a beam of light received from the first port to the second port;

a lens having a first end face facing the first port and spaced from the first port by a distance $d_2$ and having a second end face facing the optical element and spaced from the optical element by a distance $d_1$, the lens being disposed to receive the beam from the first port and to collimate the beam of light at the optical element, wherein $d_1$ is not equal to $d_2$, and, wherein $|d_1-d_2|>25$ $\mu$m.

In accordance with the invention there is provided, an optical system, wherein a rod lens is disposed between an at least partially reflective element and two optical fibres held within a same optical sleeve, the element being such that light reflected therefrom is shifted by at least 25 $\mu$m, a method of coupling a beam from one of the optical fibres to another via the reflective element, comprising the steps of:

disposing the waveguides a distance d1 from a closest end face of the lens, and disposing the optical element a distance d2 from a closest end face of the lens, wherein the distance d1 and the distance d2 differ by at least 50 $\mu$m.

In accordance with the invention there is provided, an optical device comprising:

a first port for launching a beam of light and a second port adjacent the first port for receiving via reflection at least a portion of the beam of light;

a third port for receiving a portion of the beam of light from the first port;

an optical filter for directing a beam of light received from the first port to the second port via reflection, and from the first port to the third port via transmission;

a first lens having a first end face facing the first port and spaced from the first port by a distance $d_2$ and having a second end face facing the optical element and spaced from the optical element by a distance $d_1$, the lens being disposed to receive the beam from the first port and to collimate the beam of light at the optical element, wherein $d_1$ is not equal to $d_2$, and, wherein $|d_1-d_2|>25$ $\mu$m;

and a second lens having a first end face facing the third port and having a second end face facing the optical element.

BRIEF DESCRIPTION OF THE DRAWINGS

Exemplary embodiments of the invention will now be described in conjunction with the drawings, in which.

DETAILED DESCRIPTION

Figure 1A:
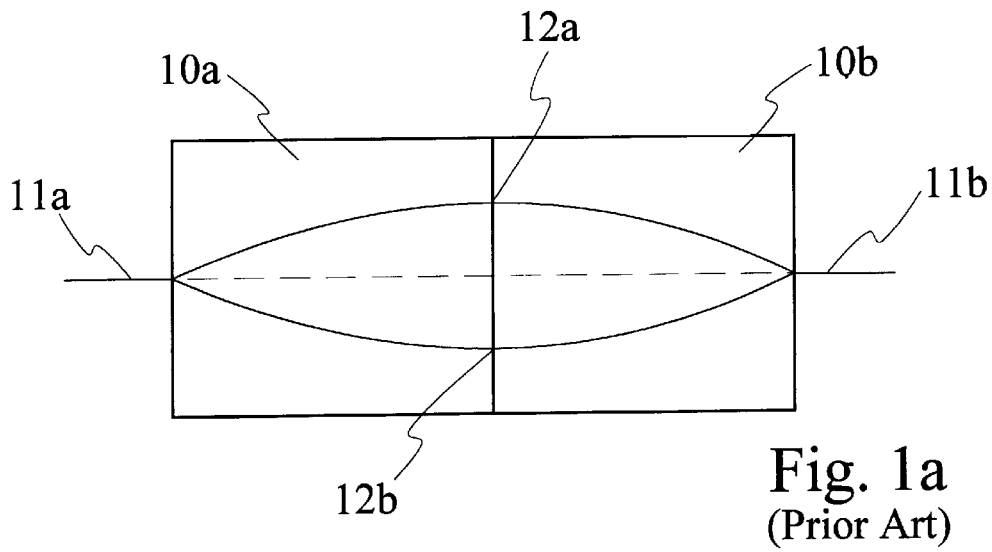
FIG. 1a is a side view of a prior art arrangement of a pair of back to back quarter pitch GRIN lenses having input/output waveguides positioned along the optical axes of the lenses.

Turning now to FIG. 1a, a pair of quarter pitch GRIN lenses 10a and 10b are shown having their collimating ends inwardly facing and their focusing ends outwardly facing. Two optical waveguides 11a and 11b are shown coaxial with and coupled to the lenses along at the optical axis of the lenses 10a and 10b shown by a dotted line. A beam profile is also shown within the lenses 10a and 10b as if light was launched from one of the waveguides 11a and 11b to a respective lens. It should be noted that the beam profile at the interface between the two lenses extends to a circumference about the lens indicated by points 12a and 12b, being two points on the circumference.

Figure 1B:
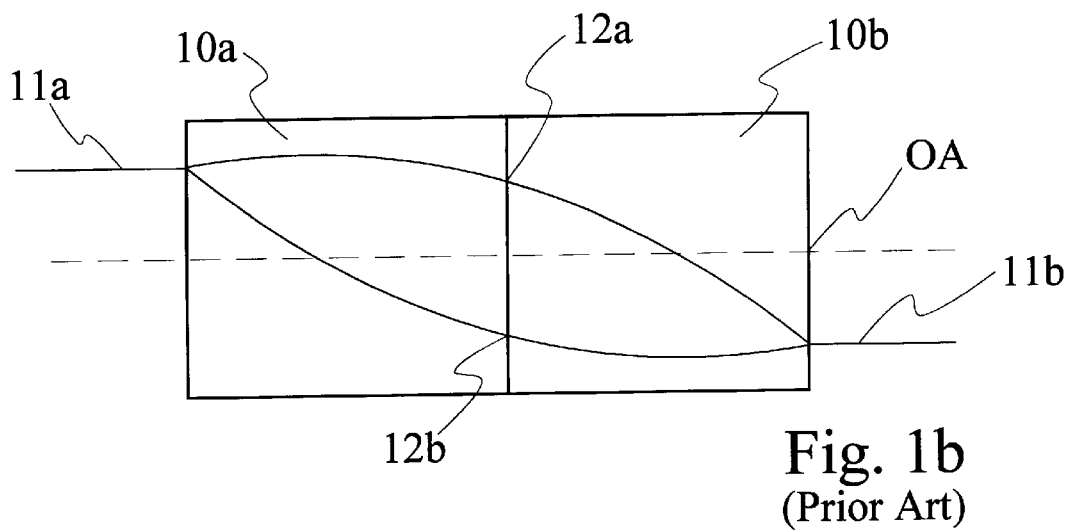
FIG. 1b is a side view of a prior art arrangement of a pair of back to back quarter pitch GRIN lenses having input/output waveguides positioned offset from the optical axes of the lenses.

FIG. 1b illustrates the same pair of GRIN lenses as in FIG. 1a, however the two optical waveguides 11a and 11b are shown to be offset a same optical distance from the common optical axis of the lenses 10a and 10b. Here, the beam profile at the interface between the two lenses extends to the same circumference as in FIG. 1a, however the angle of the beam has varied. By ensuring that there is no separation between the two lenses, and that the optical waveguides are directly coupled with respective lenses, light is most effectively coupled from one waveguide 11a into the other 11b (or vice versa) when the waveguides are parallel to the common optical axis shared by the lenses. A similar arrangment is shown in FIG. 1c, wherein input/output waveguides 11a and 11b are disposed on opposite sides of the optical axis of the lens, from that in FIG. 1b.

Figure 1C:
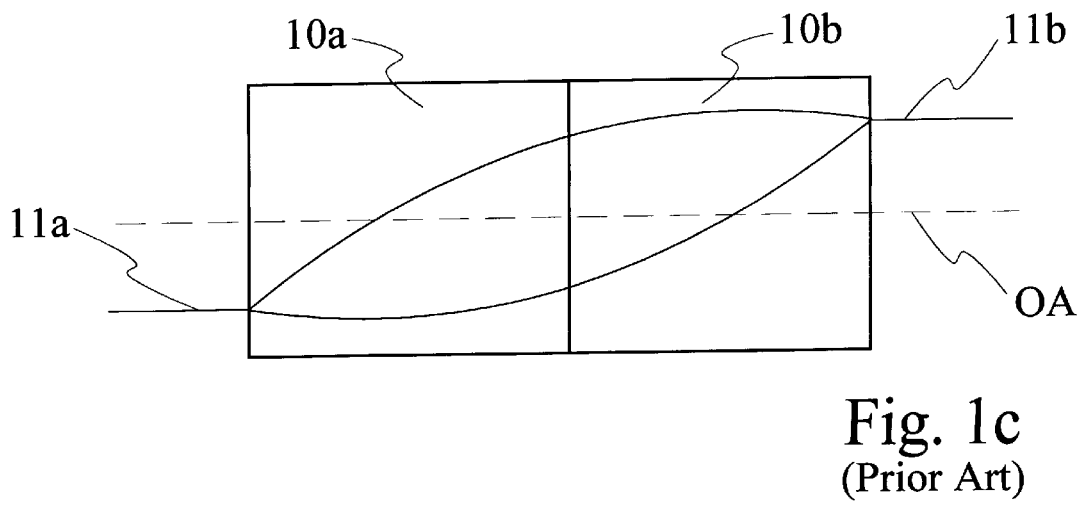
FIG. 1c is a side view of a prior art arrangement of a pair of back to back quarter pitch GRIN lenses having input/output waveguides positioned offset from the optical axes of the lenses.
Figure 2A:
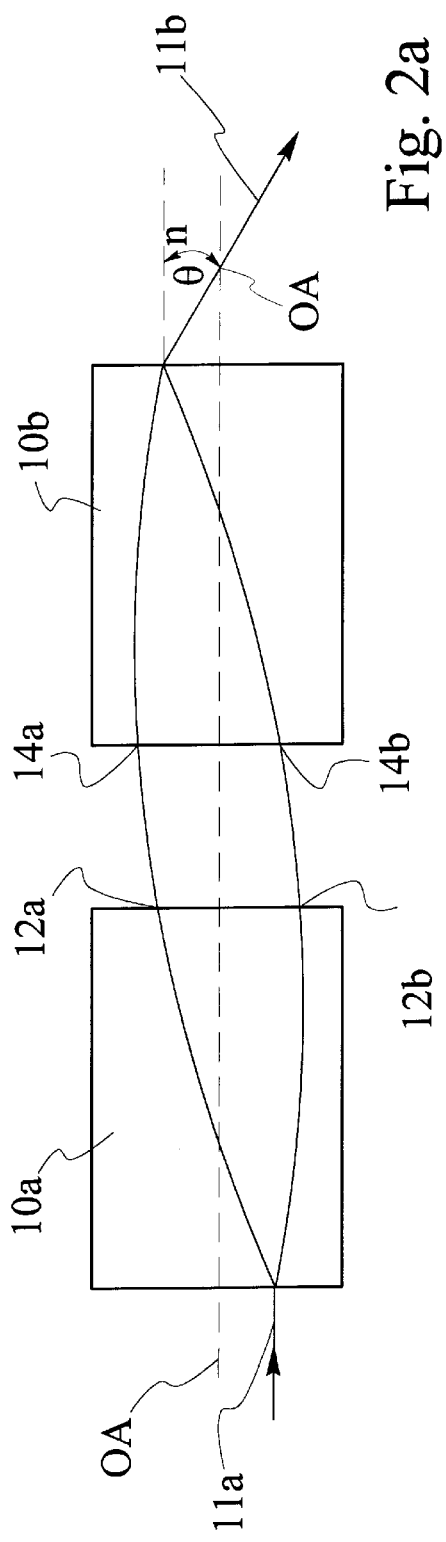
FIG. 2a is a side view of an arrangement of a pair of back to back spaced GRIN lenses having input/output waveguides positioned offset from the optical axes of the lenses; and, FIG. 2b is a side view of an arrangement of a pair of back to back spaced GRIN lenses having input/output waveguides positioned offset from the optical axes of the lenses in accordance with this invention.

Referring now to FIG. 2a, the lenses shown in FIG. 1c are now spaced apart a fixed distance. The optical axis of the waveguide 11a is shown to be parallel to the optical axis OA of the lens 10a. However, in order to efficiently couple light from the output waveguide 11b, it must be non-parallel to the input waveguide 11a and at an angle θ with respect to the optical axis of the lens 10b, dependent upon the amount of separation. Essentially as the separation increases between the two lenses, the output beam diverges from the optical axis of lens 10b.

Figure 2B:
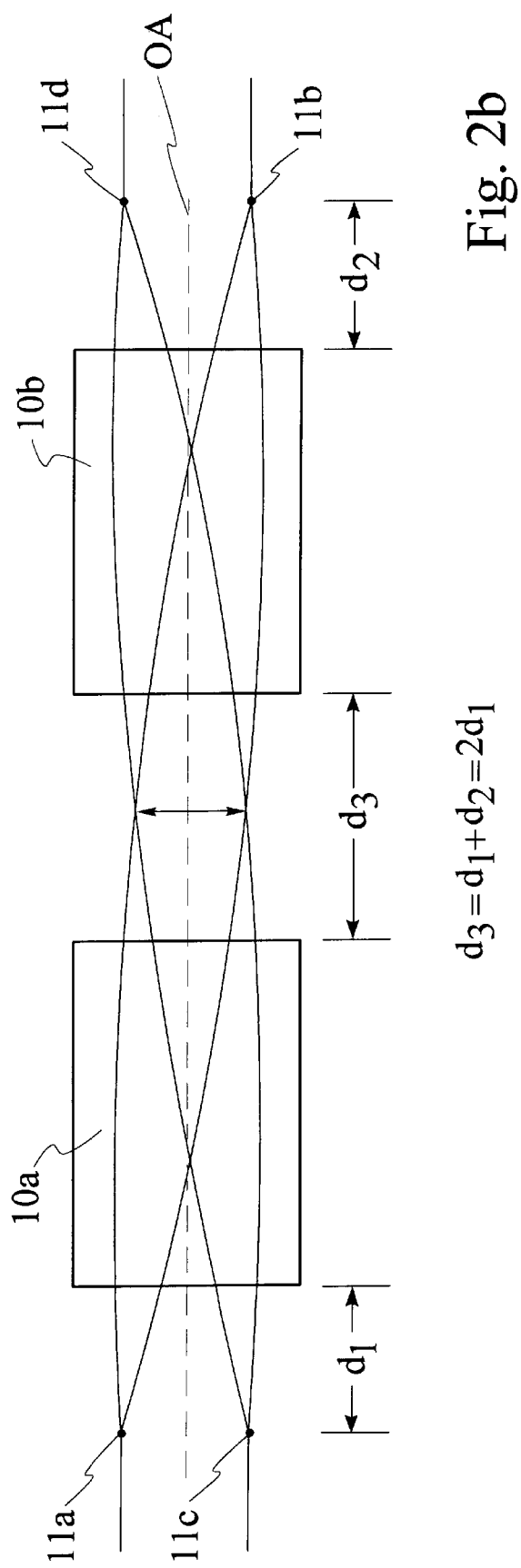

As is shown in FIG. 2b, light can efficiently be coupled from an input waveguide to an output waveguide that are both substantially parallel with an optical axis of one of the lenses 10a or 10b by ensuring that the spacing of the input waveguides and the spacing between adjacent lenses is within a predetermined ratio. More particularly, the lenses 10a and 10b shown in FIG. 2b are spaced an optical distance $d_3$. The input waveguides 11a and 11c are an optical distance $d_1$ from the end face of the lens 10a. The output waveguides 11b and 11d are an optical distance $d_2$ from their adjacent lens 10b.

It is found, that for optimum coupling to exist, and for the input and optical wavguides to have their optical axes parallel with the optical axis of the coaxial lenses, the following relationship should exist: $d_1 \approx d_2 \approx 0.5\ d_3$. In some instances, when the optical distances substantial, then the pitch of the lenses is chosen to be substantially less than a quarter pitch.

Figure 3:
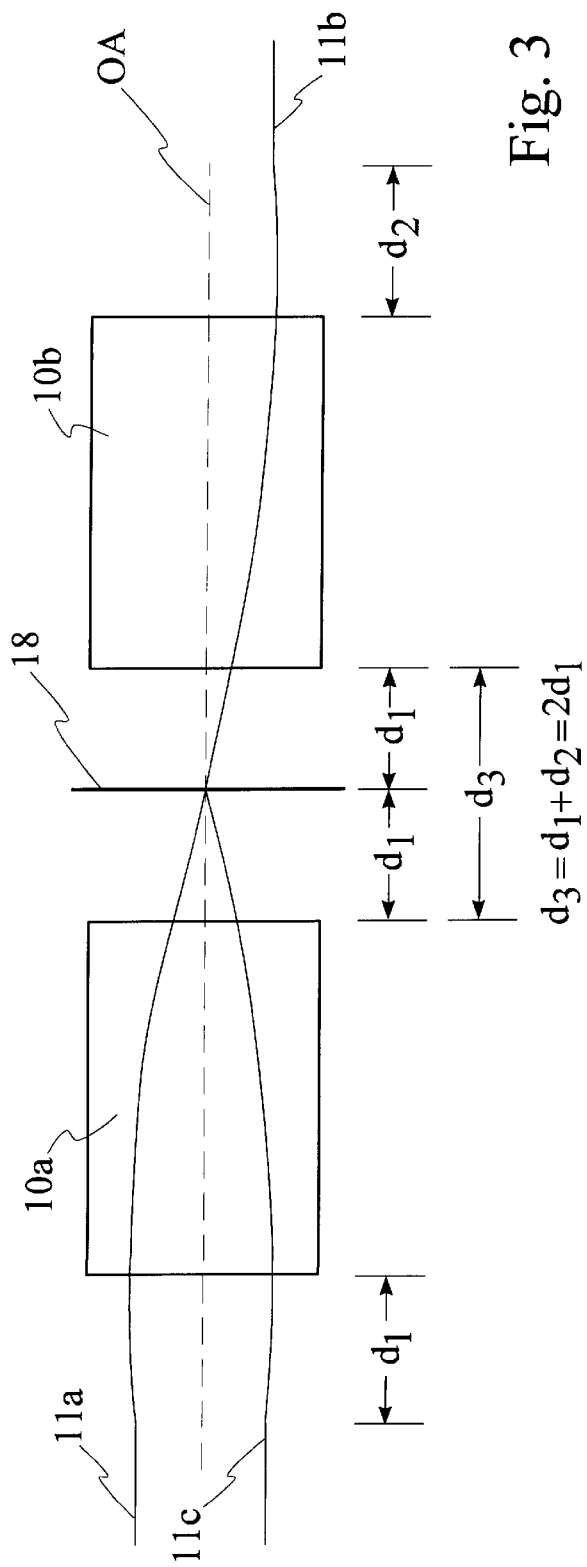
FIG. 3 is a side view of an arrangement of a pair of back to back spaced GRIN lenses having input/output waveguides positioned offset from the optical axes of the lenses and including an optical element disposed between the lenses, in accordance with this invention.

Referring now to FIG. 3, an optical arrangement is shown, wherein two focusing/collimating lenses 10a and 10b are shown having their collimating ends facing inward. The space between the lenses is $2d_1$. Input waveguides 11a, 11c and output waveguide 11b are shown spaced an optical distance $d_1$ from their adjacent lens. An optical element 18 in the form of an optical filter is shown disposed between the lenses. Conveniently, this invention provides an arrangement of elements that allows a relatively thick optical element to be disposed between the two waveguides, and in this instance between the two lenses.

However, the inventor has discovered, that when an optical element such as a multi-layered, multi-cavity filter is disposed between the two lenses, the filter in some instances causes a shift of the beam incident thereon. For example a shift in the beam by the filter, of approximately 25 μm can cause a coupling loss of 0.1 dB or greater; and a shift of 50 μm can cause a coupling loss of 0.2 dB or more.

Figure 4:
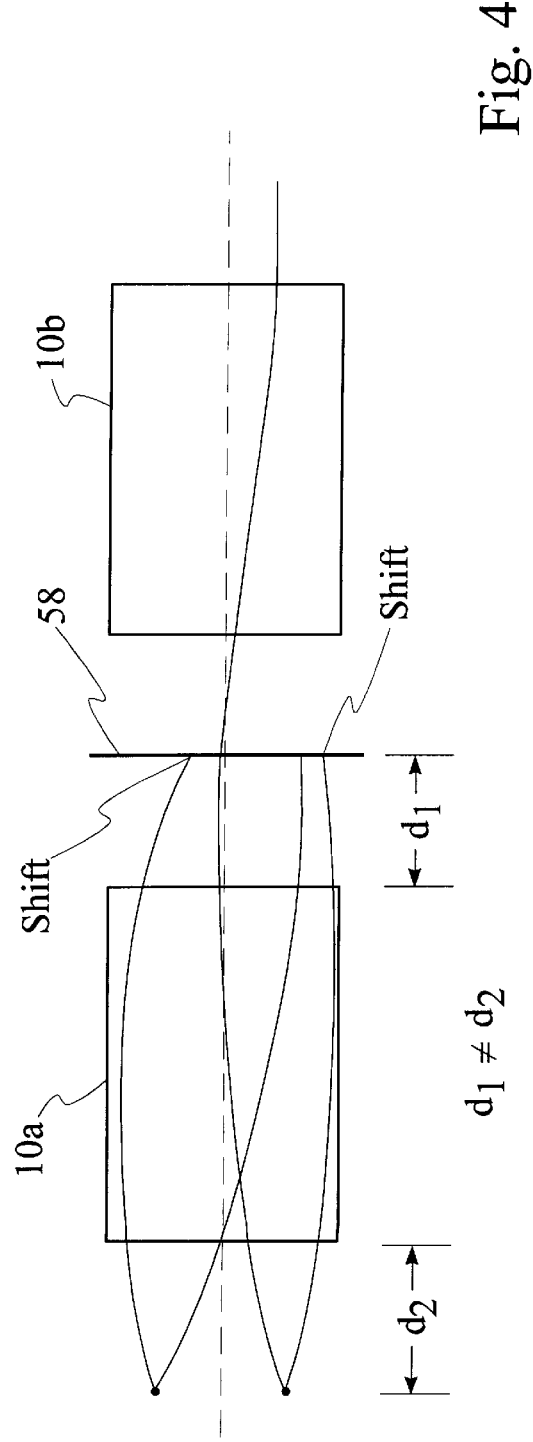
FIG. 4 is a side view of an arrangement of a pair of back to back spaced GRIN lenses having input/output waveguides positioned offset from the optical axes of the lenses and including an optical element disposed between one of the lenses and input waveguides, in accordance with this invention.

Turning now to FIG. 4 of the instant invention, an arrangement of optical elements is shown, similar to that shown in the previous figures, however it should be noted that the distance $d_1$ is not equal to $d_2$. Ensuring that these two distances differ by at least 50 μm, will provide a correction or compensation for a shift of the beam induced by the optical filter 58; hence, in this manner optical coupling is enhanced.

Figure 5:
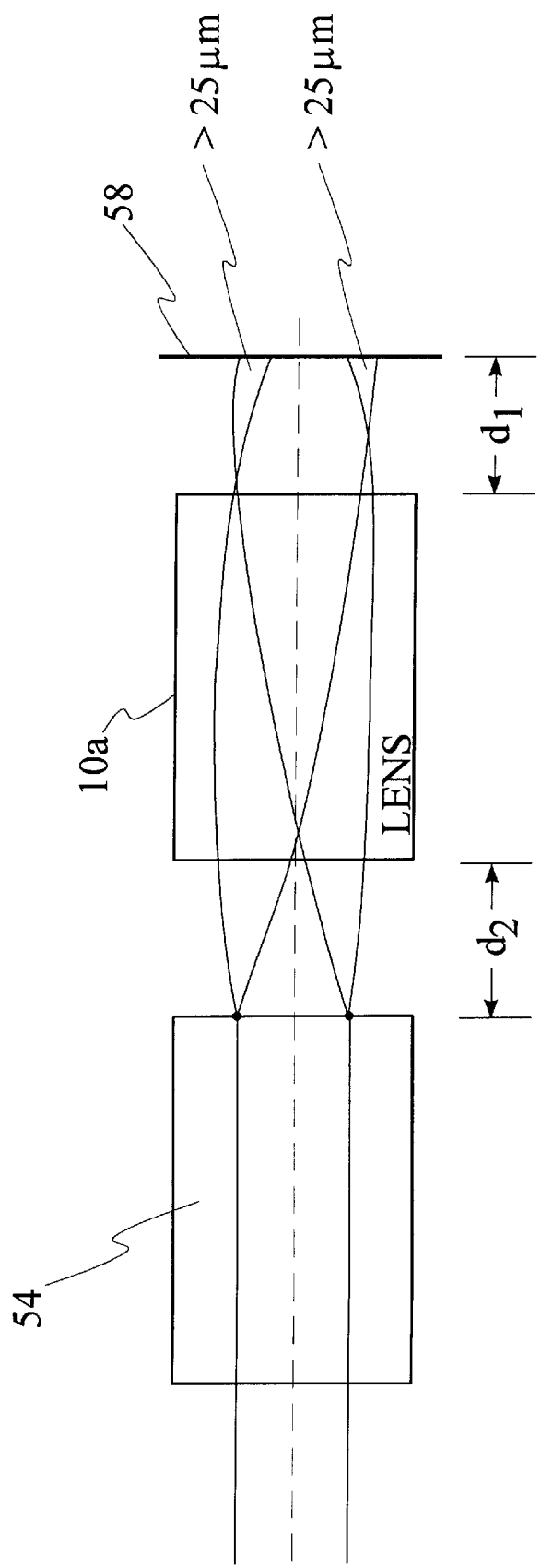
FIG. 5 is a side view of an arrangement of a pair of back to back spaced GRIN lenses having input/output waveguides positioned offset from the optical axes of the lenses and including optical elements disposed between the lenses and input waveguides, in accordance with this invention.

FIG. 5 illustrates another embodiment wherein a one sided device has elements arranged similarly, such that the distance $d_1$ between the end face of the lens and the filter is not equal to $d_2$ the distance between the end face of the lens and the optical fibres held within an optical fibre tube 54. It can be readily seen, that the incident and reflected beams are shifted or offset from one another within the filter; however by selecting $d_1$ and $d_2$ appropriately and to differ, optimum coupling can be achieved. Of course this can be done in situ, while relatively affixing these components for optimum coupling.

What is claimed is:

1. An optical device comprising:

a first port for launching a beam of light and a second port for receiving at least a portion of the beam of light;

an optical element for directing a beam of light received from the first port to the second port, the optical element having a characteristic wherein a beam of light incident thereon, is shifted by at least 25 µm;

a lens having a first end face facing the first port and spaced from the first port by a distance $d_2$ and having a second end face facing the optical element and spaced from the optical element by a distance $d_1$, the lens being disposed to receive the beam from the first port and to collimate the beam of light at the optical element, wherein $d_1$ is not equal to $d_2$, and, wherein $|d_1-d_2|>25$ µm.

2. An optical device as defined in claim 1, wherein the optical element is an optical filter.

3. An optical device as defined in claim 2, wherein the optical device is a multi-layer, multi-cavity optical filter.

4. An optical device as defined in claim 1, wherein the device has only a single lens, and wherein the lens is a graded-index lens.

5. An optical device as defined in claim 4, wherein the first and second port are adjacent each other and both face a same side of the graded-index lens.

6. An optical device as defined in claim 1, wherein $d_1$ and $d_2$ are greater than zero.

7. An optical device comprising:

a first port for launching a beam of light and a second port adjacent the first port for receiving via reflection at least a portion of the beam of light;

a third port for receiving a portion of the beam of light from the first port;

a multi-layer optical filter for directing a beam of light received from the first port to the second port via reflection, and from the first port to the third port via transmission, the multi-layer filter shifting a beam traversing therethrough and reflecting therefrom by at least 25 µm;

a first lens having a first end face facing the first port and spaced from the first port by a distance $d_2$ and having a second end face facing the optical element and spaced from the optical element by a distance $d_1$, the lens being disposed to receive the beam from the first port and to collimate the beam of light at the optical element, wherein $d_1$ is not equal to $d_2$, and, wherein $|d_1-d_2|>25$ µm;

and a second lens having a first end face facing the third port and having a second end face facing the optical element.

8. An optical device as defined in claim 7, wherein $d_1$ and $d_2$ are greater than zero.

9. An optical device as defined in claim 7, wherein the optical element induces a shift of at least 25 µm to a beam incident thereon, and wherein the unequal distances $d_1$ and $d_2$ provide compensation for this shift to enhance the coupling of light between at least the first port and the second port.

10. An optical device as defined in claim 7, wherein the first and second lenses collimating ends that are inwardly facing and the at least focusing ends that are outwardly facing.

11. An optical device as defined in claim 10, wherein the two lenses are substantially coaxial.

12. An optical device as defined in claim 10, wherein the two lenses are GRIN lenses.

13. An optical device as defined in claim 7, wherein the lenses are substantially less than quarter pitch lenses.

14. An optical device as defined in claim 13, wherein the input and output waveguides have optical axes that are parallel to and offset from the optical axis of the substantially coaxial GRIN lenses.

15. In an optical system, wherein a rod lens is disposed between an at least partially reflective element and two optical fibres held within a same optical sleeve, the element being such that light reflected therefrom is shifted by at least 25 µm, a method of coupling a beam from one of the optical fibres to another via the reflective element, comprising the steps of:

disposing the waveguides a distance d1 from a closest end face of the lens, and disposing the optical element a distance d2 from a closest end face of the lens, wherein the distance d1 and the distance d2 differ by at least 50 µm.

* * * * *